United States Patent
Bogenrieder et al.

(10) Patent No.: US 9,085,276 B2
(45) Date of Patent: Jul. 21, 2015

(54) AIRBAG, IN PARTICULAR FOR A MOTOR VEHICLE

(75) Inventors: Ralf Bogenrieder, Stuttgart (DE); Christian Burczyk, Stuttgart (DE); Andreas Hirth, Dielheim (DE); Friedrich Reiter, Sindelfingen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/343,727

(22) PCT Filed: Aug. 7, 2012

(86) PCT No.: PCT/EP2012/003366
§ 371 (c)(1),
(2), (4) Date: Jun. 3, 2014

(87) PCT Pub. No.: WO2013/034230
PCT Pub. Date: Mar. 14, 2013

(65) Prior Publication Data
US 2014/0265260 A1  Sep. 18, 2014

(30) Foreign Application Priority Data
Sep. 8, 2011  (DE) .......................... 10 2011 112 882

(51) Int. Cl.
*B60R 21/26* (2011.01)
*B60R 21/20* (2011.01)
*B60R 21/205* (2011.01)
*B60R 21/231* (2011.01)

(52) U.S. Cl.
CPC .............. *B60R 21/20* (2013.01); *B60R 21/205* (2013.01); *B60R 21/231* (2013.01); *B60R 2021/23115* (2013.01)

(58) Field of Classification Search
CPC .... B60R 21/233; B60R 21/231; B60R 21/20; B60R 21/205; B60R 21/23115
USPC ........... 280/728.1, 729, 731, 732, 738, 743.1, 280/743.2
See application file for complete search history.

(56) References Cited

U.S. PATENT DOCUMENTS

| | | | |
|---|---|---|---|
| 3,731,949 A | * | 5/1973 | Radke .................. 280/743.1 |
| 3,733,091 A | * | 5/1973 | Fleck et al. ............... 280/729 |
| 3,784,225 A | | 1/1974 | Fleck et al. |

(Continued)

FOREIGN PATENT DOCUMENTS

| DE | 2 221 918 A1 | 11/1972 |
|---|---|---|
| DE | 10 2007 052 246 A1 | 5/2009 |

(Continued)

OTHER PUBLICATIONS

International Search Report dated Nov. 9, 2012 (Three (3) pages).

(Continued)

*Primary Examiner* — Ruth Ilan
*Assistant Examiner* — Darlene P Condra
(74) *Attorney, Agent, or Firm* — Crowell & Moring LLP

(57) ABSTRACT

An airbag for a motor vehicle includes a support structure with a plurality of support elements. The support structure is moveable from a storage position to a support position and by which a support volume of the airbag is covered at least partially in the support position. At least one of the support elements is curved at least in one section in the support position.

8 Claims, 1 Drawing Sheet

(56) References Cited

U.S. PATENT DOCUMENTS

| | | | |
|---|---|---|---|
| 3,843,150 A | 10/1974 | Harada et al. | |
| 3,960,386 A * | 6/1976 | Wallsten | 280/731 |
| 3,970,328 A | 7/1976 | Wallsten | |
| 4,076,277 A * | 2/1978 | Kuwakado et al. | 280/738 |
| 5,160,164 A * | 11/1992 | Fischer et al. | 280/743.2 |
| 5,306,042 A * | 4/1994 | Frank | 280/728.3 |
| 5,542,695 A * | 8/1996 | Hanson | 280/729 |
| 6,467,805 B1 * | 10/2002 | Schnowitz et al. | 280/740 |
| 7,195,279 B2 * | 3/2007 | Rose et al. | 280/740 |
| 7,448,644 B2 * | 11/2008 | Zhong et al. | 280/729 |
| 7,500,694 B2 * | 3/2009 | Heudorfer et al. | 280/729 |
| 7,942,443 B2 * | 5/2011 | Dennis et al. | 280/743.2 |
| 8,651,522 B2 | 2/2014 | Hirth et al. | |
| 2006/0157958 A1 * | 7/2006 | Heudorfer et al. | 280/730.2 |
| 2007/0273128 A1 * | 11/2007 | Cheal | 280/728.2 |
| 2010/0156077 A1 * | 6/2010 | Miyata | 280/743.2 |
| 2010/0164212 A1 * | 7/2010 | Nakayama | 280/743.2 |
| 2011/0049846 A1 * | 3/2011 | Hirth et al. | 280/729 |
| 2012/0193896 A1 * | 8/2012 | Turnbull et al. | 280/729 |
| 2013/0099470 A1 * | 4/2013 | Wipasuramonton et al. | 280/742 |

FOREIGN PATENT DOCUMENTS

| | | |
|---|---|---|
| FR | 2 115 985 A5 | 7/1972 |
| FR | 2 217 188 A1 | 9/1974 |
| GB | 1 321 796 A | 6/1973 |
| JP | H02-88343 A | 3/1990 |
| WO | WO 2011/099158 A1 | 8/2011 |

OTHER PUBLICATIONS

German-language Written Opinion dated Nov. 9, 2012 (Six (6) pages).

* cited by examiner

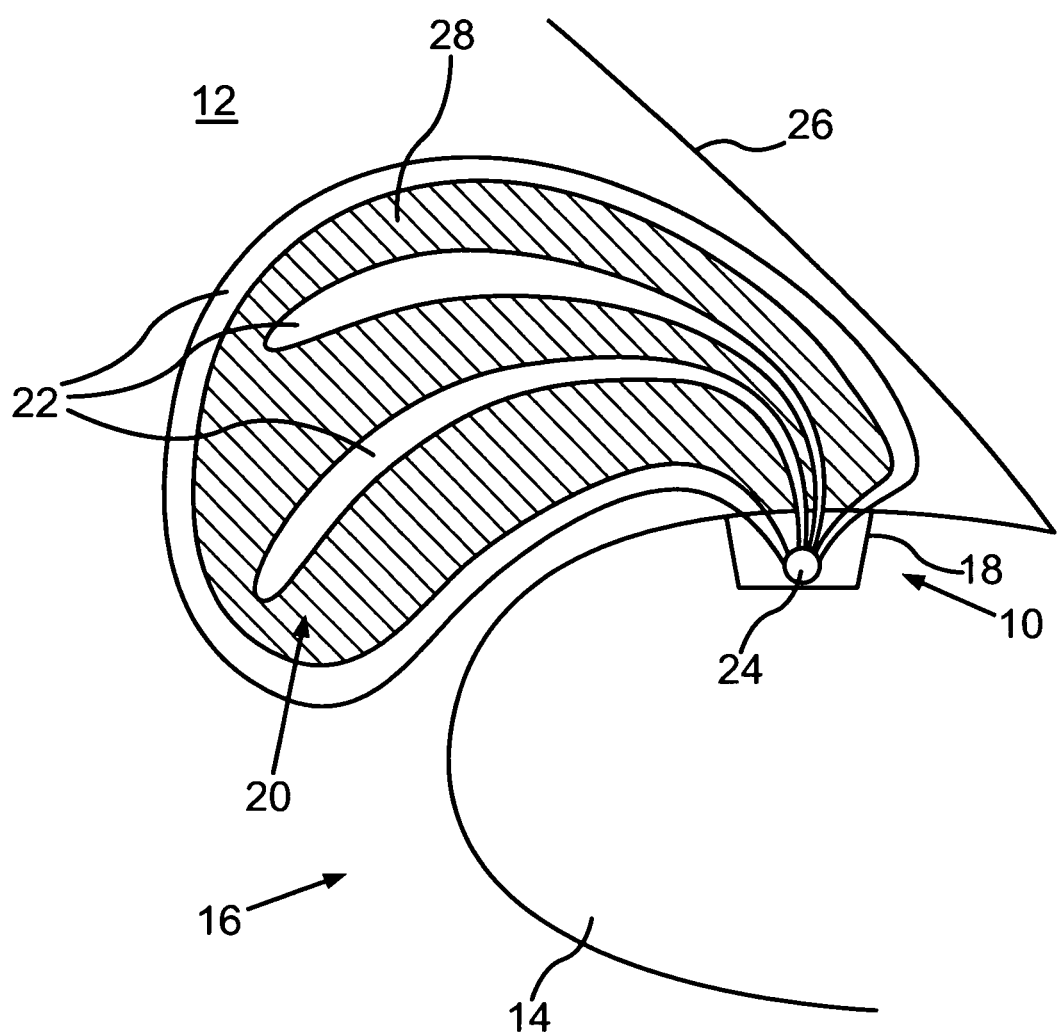

AIRBAG, IN PARTICULAR FOR A MOTOR VEHICLE

BACKGROUND AND SUMMARY OF THE INVENTION

Exemplary embodiments of the present invention relate to an airbag, in particular for a motor vehicle.

German patent document DE 10 2007 052 246 A1 discloses a motor vehicle airbag having a support structure, which is able to move from its storage position to a support position. The support structure comprises a plurality of support elements.

The catching and support structure of such an airbag as well as other airbags is particularly advantageous if the support structure can be moved from the storage position to the support position in only a very short space of time. Then, at least one passenger of the motor vehicle can be caught, supported in good time in the case of a force impact caused by an accident, and thus can be protected from severe injuries.

Accordingly, exemplary embodiments of the present invention are directed to an airbag, in particular for a motor vehicle, with a support structure of the airbag can be moved to the support position in a particularly short space of time.

Such an airbag, in particular for a motor vehicle, and in particular for a passenger vehicle, comprises a support structure having a plurality of support elements. The support structure is moveable from a storage position to a support position. A support volume of the airbag is at least partially covered by the support structure in its support position.

According to the invention, at least one of the support elements is curved at least in one section in the support position. In particular, the curved support element can be curved at least in the section at least substantially in an arch-shape. Through the curving, the at least one support element and in particular the entire support structure can be adapted to ambient geometries. In other words, it is possible to adapt the support structure to the pre-set installation space conditions and thus to components or similar of the motor vehicle adjacent to the support structure in its support position using the curving, and to shape the outer shape or outer contour in which the support structure is to be set.

In contrast to support elements of the support structure that only run straight, the at least one support element can be pre-curved at least in one section or in a plurality of sections and can be adapted accordingly, such that the at least one support element or the support structure already assumes its desired shape or structure in the support position. Using the at least one pre-curved support element, the time in which the support structure is moved from the storage position to the support position can thus be kept particularly low.

Therein, the support structure can be formed as a mechanical support structure and can comprise a plurality of lifting elements as support elements, which are connected to one another in an articulated manner, and which are moved, for example, at least substantially in a scissor motion from the storage position to the support position.

Alternatively, the support elements are formed as hollow body parts, which are inflated with a medium, in particular gas, to move to the support position. In particular in the case of hollow body parts, the unfolding time of the support structure from the storage position to the support position can be kept particularly low by the curving or pre-curving of at least one of the hollow body parts, since bends of the hollow body parts, which can particularly occur when there are hollow body parts running in a substantially straight line and which arise in order to adapt the outer contour of the support structure to the installation space conditions, can be prevented. Likewise, a cross-section reduction of the hollow body parts due to wrinkling can be prevented.

Thus, the support structure can be filled and inflated with the medium, in particular gas, in a particularly short space of time by means of an actuator, in particular a pyrotechnic actuator, and thus can be moved from the storage position to the support position in a particularly short space of time. The flowing of the medium, in particular the gas flow, is optimized therein with regard to the energy loss, such that advantageously, an actuator, which is dimensioned to be particularly small with regard to its dimensions and/or its power consumption, in particular a gas generator, can be used to move the support structure to the storage position. This keeps the installation space requirement and the weight of the airbag low, such that this can be positioned particularly advantageously in the passenger space of the motor vehicle relative to this.

A further advantage of the curving or pre-curving of the at least one support element or of the at least one hollow body part is that the movement of the support structure to the support position can be controlled particularly advantageously by the predefined and pre-set curving. Thus the support structure can be moved particularly efficiently to the support position and the passenger advantageously can be caught, supported and thus protected from severe injuries in the case of a force impact due to an accident.

Therein, the support structure is preferably at least substantially formed in a latticed manner, wherein the support elements function as struts of the support structure formed as a lattice and are connected accordingly to one another. The airbag is then referred to as a lattice bag.

The inflatable hollow body parts are therein preferably at least substantially formed in a tubular manner and are connected at least partially fluidically to one another. Preferably, all hollow body parts are connected fluidically to one another. Due to this fluid connection, a total volume is created, which is to be loaded or inflated with the medium, in particular the gas, to move the support structure from the storage position to the support position. Thus, the support structure unfolds from the storage position to the support position. Through the pre-curving of the at least one hollow body part, the unfolding can occur therein particularly quickly and thus in a short space of time.

The support structure comprising hollow body parts that are connected fluidically to one another has the advantage that the total volume loaded with the medium is substantially smaller than the support volume, which is covered by the support structure in the support position. Thus, the support structure can be moved to the support position particularly quickly and smoothly for the passengers to be caught, and in this position can assume a particularly large volume in the passenger space of the motor vehicle. Thus, the passenger can be caught and protected from severe injuries in good time in the case of a force impact due to an accident.

The airbag according to the invention comprises at least one actuator, in particular at least one gas generator, to move the support structure to the support position, by means of which the total volume is actively filled with the medium, in particular the gas. In this way, the relatively small total volume can be filled with a relatively small quantity of the medium.

Free areas or free spaces are formed between the support elements (hollow body parts), via which air, in particular ambient air from the passenger space, can flow at least substantially passively into the support volume. A volume increase of the support volume occurs during the movement of the support structure from the storage position to the support position. Therein, a vacuum is formed in the support volume, which sucks in air, in particular ambient air from the passenger space, and inserts it into the support volume. Thus, the relatively large support volume is filled passively with air. An active filling of the support volume with air, for example by means of at least one additional gas generator, is not necessarily provided, however can be provided for means of support.

Preferably, the airbag comprises a cover, by means of which the support volume and, in particular, the free spaces or free areas between the support elements are covered. The cover preferably has a valve unit. In other words, a valve functionality is integrated into the cover, which enables the flow of the air, in particular the ambient air, into the support volume in a first flow direction. A flow of the air received in the support volume from the support volume in a second flow direction opposed to the first flow direction is advantageously at least substantially prevented by the cover or its valve functionality. Alternatively it can be provided that the cover or its valve functionality only enables a reduced flow of the air from the support volume in the second flow direction compared to the in-flow. This means that the air located in the support volume can flow out of the support volume with a lower mass flow than it can or could flow into the support volume. Thus, a particularly long service life of the support structure is created, which is advantageous for the catching and support function of the airbag.

The curving or pre-curving of the support element is, for example, effected by means of a tensioning element, in particular an elasticated band, a tightening strap or similar. Thus, a particularly defined pre-curving can be depicted, such that the support element can be adapted particularly advantageously with regard to its outer contour to installation space conditions and accordingly to components or similar arranged in the region adjacent to the support structure in the support position. This enables the filling time to fill the total volume with the gas to be kept low, such that the support structure is able to be brought to a pre-set and desired position at an advantageous point in time.

Further advantages, features and details of the invention arise from the description of a preferred exemplary embodiment below, as well as by means of the drawing. The features and feature combinations referred to in the description above and below in the description of the figures and/or shown in the FIGURE alone can be used not only in each specified combination, but also in other combinations or individually, without leaving the scope of the invention.

BRIEF DESCRIPTION OF THE DRAWING FIGURE

The single FIGURE illustrates a schematic sectional view of an airbag having a support structure in a passenger space of a passenger vehicle, wherein the support structure comprises a plurality of inflated tube elements, which are pre-curved and thus are adapted to the installation space conditions in the passenger space.

DETAILED DESCRIPTION

The FIGURE shows an airbag 10 in a passenger space 12 of a passenger vehicle. A dashboard 14 of a cockpit 16 of the passenger vehicle is also arranged in the passenger space 12. As can be seen from the FIGURE, the airbag 10 is therein held on the dashboard 14. The airbag 10 comprises a housing 18 arranged on or at least partially in the dashboard 14. A support structure 20 of the airbag 10 is fastened to the housing 18. The support structure 20 comprises a plurality of pre-curved tubes 22. In other words, the tubes 22 are curved or pre-curved and thus are adapted to the installation space conditions in the passenger space 12.

The support structure 12 is able to move from a storage position to a support position shown in the FIGURE. The tubes 22 are able to be inflated with gas, in particular air, by means of at least one gas generator 24 of the airbag 10, via which the support structure 20 is fastened, for example, to the housing 18. Therein, a support volume of the airbag is covered at least partially by the support structure 20 in the support position.

Furthermore, as can be seen in the FIGURE, the dashboard 14 and a wind screen 26 of the passenger vehicle are arranged in a region adjacent to the support structure 20 with regard to the support position. The support structure 20 has a desired and advantageous structure and outer contour in the support position due to the curving of the tubes 22, the structure and outer contour being adapted to the ambient conditions given by the dashboard 14 and the windscreen 26. Thus, the support structure 20 can be moved from the storage position to the support position in only a particularly short space of time and thus particularly quickly, without first being brought into the desired position and outer contour through collision and support with or from the windscreen 26 and/or with or from the dashboard 14. In fact, the support structure 20 has its desired outer contour due to the pre-curving, also without the collision and/or support.

The airbag 10 further comprises a cover 28 with which the support structure 20 is covered. The cover 28 is formed therein as a valve textile and provides a valve functionality.

The support structure 20 is at least substantially formed in a latticed manner and thus as a lattice, wherein the tubes 22 form struts of the lattice. Free spaces or free areas are formed between the tubes 22, via which ambient air from the passenger space 12 can flow into the support volume in a first flow direction through the cover 28. This is effected by the inflation of the support structure 20 or the tubes 22 as the support structure 20 unfolding from the storage position to the support position sucks in ambient air from the passenger space 12 and thus inserts it into the support volume.

The valve functionality of the cover 28 enables the flow of the ambient air into the support volume in the first flow direction. The cover 28 holds back the air located in the support volume (ambient air) using its valve functionality, such that the air located in the support volume cannot flow out of the support volume in a second flow direction opposed to the first flow direction or can flow out of the support volume in a manner that is restricted compared to the in-flow. This is advantageous for a long service life of the airbag 10.

The tubes 22 are, for example, formed by at least two textile layers, which are sewn to one another in the edge regions using seams. The textile layers can lift off one another in the intermediate regions between the seams. The gas can flow into these intermediate regions, such that the respective volumes of the tubes 22 are enlarged by being loaded with the gas, and thus are inflated. Therein, the pre-curving of the tubes 22 shown in the FIGURE is, for example, effected by means of the course of the seams. Alternatively or additionally, the pre-curving can be formed by inserting tensioning elements such as elasticated bands or tightening straps.

In all respects, the support structure 20 or the entire airbag 10 is adapted with respect to its outer contour to the installation space conditions, i.e. to the ambient geometries formed by the windscreen 26 and the dash board 14, such that the support structure 20 can be moved to the support position in a particularly short space of time.

The pre-curving of the tubes 22 has the advantage that bends in the tubes, such as can be the case in tubes that run at least substantially straight, as well as undesired cross-section reduction through wrinkling, can be avoided. Thus, the flow of the gas into the tubes 22 is not negatively influenced and the gas can spread out particularly quickly in the support structure 20 and inflate this particularly quickly. Thus, the flow of the air is optimized with regard to energy loss, such that the gas generator 24 can be dimensioned to be particularly small with regard to its outer dimensions and/or its power consumption. Furthermore the unfolding of the support structure 20 can be targetedly controlled using the predefined pre-curving of the tubes 22, such that at least one passenger of the passenger space 12 can be advantageously caught, supported and protected from severe injuries in the case of the impact force due to an accident.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An airbag for a motor vehicle, comprising:
a housing configured for installation in a top portion of a dashboard of the motor vehicle, wherein the top portion of the dashboard faces a windscreen of the motor vehicle;
a support structure having a plurality of support elements, wherein the support structure is moveable from a storage position in the housing to a support position,
wherein a support volume of the airbag is covered at least partially in the support position, and
wherein at least one of the support elements is curved at least in one section in the support position, wherein the curved section is configured so that the support structure does not collide with and is not supported by the windscreen and the dashboard when moved from the storage position to the support position.

2. The airbag of claim 1, wherein the curved support element is curved at least substantially in an arch shape.

3. The airbag of claim 1, wherein the curved support element is curved by means of at least one tensioning element.

4. The airbag of claim 3, wherein the at least one tensioning element is a tightening strap or an elasticated band.

5. The airbag of claim 1, wherein the support elements are hollow body parts, which are inflatable with a gas to move into the support position.

6. The airbag of claim 5, wherein at least the curved hollow body part is formed by at least two textile layers that are sewn together along at least one seam, wherein the curved hollow body part is formed in a curved manner by the seam.

7. The airbag of claim 1, wherein in the support position the curved section causes the support structure to be spaced apart from and follow a contour of the dashboard.

8. The airbag of claim 1, wherein the at least one of the support elements with a curved section comprises a first, second, and third support element, wherein the first support element surrounds the second and third support elements.

* * * * *